(12) United States Patent
Bhattad et al.

(10) Patent No.: US 11,595,236 B2
(45) Date of Patent: Feb. 28, 2023

(54) TECHNIQUES FOR DEMODULATION REFERENCE SIGNAL TIME DOMAIN PATTERN CONFIGURATION

(71) Applicant: QUALCOMM Incorporated, San Diego, CA (US)

(72) Inventors: Kapil Bhattad, Bangalore (IN); Ananta Narayanan Thyagarajan, Bangalore (IN); Jing Sun, San Diego, CA (US); Xiaoxia Zhang, San Diego, CA (US); Tae Min Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 16/947,683

(22) Filed: Aug. 12, 2020

(65) Prior Publication Data
US 2021/0051052 A1    Feb. 18, 2021

(30) Foreign Application Priority Data
Aug. 16, 2019   (IN) .............................. 201941033074

(51) Int. Cl.
*H04L 27/26* (2006.01)
*H04L 5/00* (2006.01)

(52) U.S. Cl.
CPC ........ *H04L 27/2613* (2013.01); *H04L 5/0007* (2013.01); *H04L 5/0048* (2013.01)

(58) Field of Classification Search
CPC . H04L 27/2613; H04L 5/0007; H04L 5/0048; H04L 5/0053; H04L 27/261; H04L 25/0228; H04L 25/0226; H04L 5/0051; H04L 5/0094
See application file for complete search history.

(56) References Cited

U.S. PATENT DOCUMENTS

| 2019/0149365 A1* | 5/2019 | Chatterjee | H04L 5/0044 |
| | | | 370/329 |
| 2019/0297629 A1* | 9/2019 | Lin | H04L 5/0053 |
| 2020/0252939 A1* | 8/2020 | Lin | H04W 72/0493 |
| 2020/0382354 A1* | 12/2020 | Sengupta | H04L 5/001 |

(Continued)

FOREIGN PATENT DOCUMENTS

| WO | 2018053009 A1 | 3/2018 |
| WO | 2019109921 A1 | 6/2019 |

OTHER PUBLICATIONS

3GPP TSG RAN WG1 Meeting #98 R1-1909357 Prague, Czech, Aug. 26-30, 2019; "Correction on PDSCH type B DMRS location when DMRS collides with a search space set"; Nokia et al. (Year: 2019).*

(Continued)

*Primary Examiner* — Benjamin H Elliott, IV

(57) ABSTRACT

Various aspects of the present disclosure generally relate to wireless communication. In some aspects, a base station and/or a user equipment may determine a time domain resource pattern for a set of demodulation reference signals (DMRSs), wherein the set of DMRSs is included in a Type-B physical downlink shared channel (PDSCH). A base station may transmit, and the user equipment may receive, the set of DMRSs using a set of resources determined based at least in part on the time domain resource pattern. Numerous other aspects are provided.

40 Claims, 19 Drawing Sheets

(56) References Cited

U.S. PATENT DOCUMENTS

2021/0051052 A1* 2/2021 Bhattad ............... H04L 25/0226
2021/0058949 A1* 2/2021 Kim .................. H04W 72/1268

OTHER PUBLICATIONS

3GPP TSG RAN WG1 Meeting #98 R1-1909673 Praha, Česká Republika, Aug. 26-30, 2019; "Type-B DMRS shifting due to collision with CORESET"; Nokia et al. (Year: 2019).*

Ericsson: "Enhancements for Dynamic Spectrum Sharing in Rel-16", 3GPP Draft, 3GPP TSG-RAN Meeting #84, RP-191042 Enhancements for Dynamic Spectrum Sharing in Rel-16, 3rd Generation Partnership Project (3GPP), Mobile Competence Centre, 650, Route Des Lucioles, F-06921 Sophia-Antipolis Cede, vol. TSG RAN. No. Newport Beach, CA, USA; Jun. 3, 2019-Jun. 6, 2019, Jun. 2, 2019 (Jun. 2, 2019).

Huawei, et al, "DL Channels and Signals in NR Unlicensed Band", 3GPP Draft, 3GPP TSG RAN WG1 Meeting #97, R1-1906042, 3rd Generation Partnership Project (3GPP), Mobile Competence Centre; 650, Route Des Lucioles, F-06921 Sophia-Antipolis Cedex; France, vol. RAN WG1, No. Reno, USA; May 13, 2019-May 17, 2019, May 13, 2019 (May 13, 2019), XP051727499, 12 Pages, Retrieved from the Internet: URL: http://www.3gpp.org/ftp/Meetings%5F3GPP%5FSYNC/RAN1/Docs/R1%2D1906042%2Ezip, [retrieved on May 13, 2019], Section 2.2.

International Search Report and Written Opinion—PCT/US2020/070408—ISA/EPO—dated Nov. 17, 2020.

Panasonic: "DMRS Mapping for POSCH Mapping Type B in DSS Operation". 3GPP Draft, 3GPP TSG RAN WG1 #98, R1-1908815_TEI16_PANASONIC, 3rd Generation Partnership Project (3GPP), Mobile Competence Centre; 650, Route Des Lucioles; F-06921 Sophia-Antipolis Cedex; France, vol. RAN WG1, No. Prague, CZ; Aug. 26, 2019-Aug. 30, 2019, Aug. 16, 2019 (Aug. 16, 2019), XP051765423, 4 Pages, Retrieved from the Internet: URL: http://www.3gpp.org/ftp/tsg_ran/WG1_RL1/TSGR1_98/Docs/R1-1908815.zip, [retrieved on Aug. 16, 2019], the whole document.

QUALCOMM Incorporated: "DL Signals and Channels for NR-U", 3GPP Draft; 3GPP TSG RAN WG1 Meeting #98, R1-1909243 7.2.2.1.2 DL Signals and Channels for NR-U, 3rd Generation Partnership Project (3GPP), Mobile Competence Centre; 650, Route Des Lucioles, F-06921 Sophia-Antipolis Cedex; Fran, vol. RAN WG1, No. Prague, CZ; Aug. 26, 2019-Aug. 30, 2019, Aug. 17, 2019 (Aug. 17, 2019).

QUALCOMM: "Summary of Issues for PDSCH/PUSCH's DM-RS", 3GPP Draft; 3GPP TSG RAN WG1 Meeting #92, R1-1803323, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 27, 2018 (Feb. 27, 2018), XP051398475, 16 Pages, Retrieved from the Internet: URL: http://www.3gpp.org/ftp/tsg%5Fran/WG1%5FRL1/TSGR1%5F92/Docs/, [retrieved on Feb. 27, 2018], Section 9, the Whole Document.

* cited by examiner

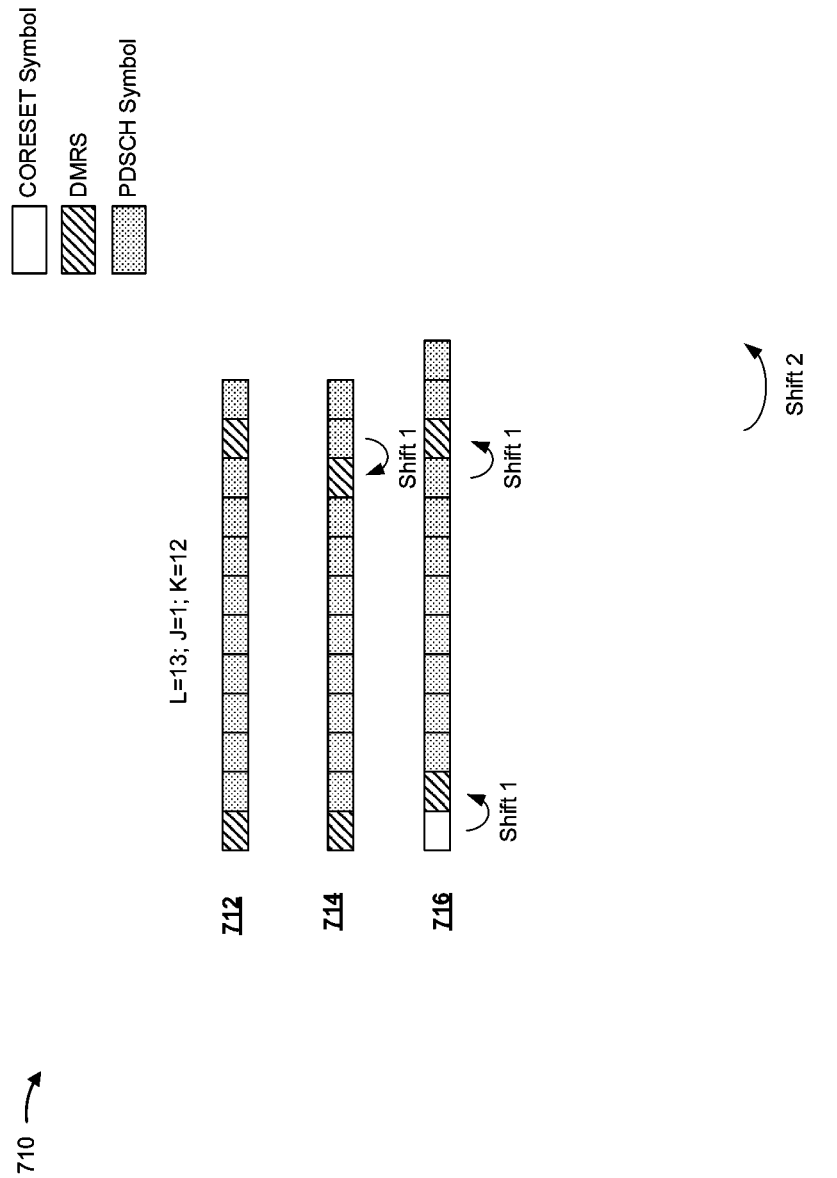

CORESET Symbol
DMRS
PDSCH Symbol 742  744  746

Shift 1

740

TECHNIQUES FOR DEMODULATION REFERENCE SIGNAL TIME DOMAIN PATTERN CONFIGURATION

CROSS-REFERENCE TO RELATED APPLICATION

This patent application claims priority to India Patent Application No. 201941033074, filed on Aug. 16, 2019, entitled "TECHNIQUES FOR DEMODULATION REFERENCE SIGNAL TIME DOMAIN PATTERN CONFIGURATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for demodulation reference signal time domain pattern configuration.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a time domain resource pattern for a set of demodulation reference signals (DMRSs), wherein the set of DMRSs is included in a Type-B physical downlink shared channel (PDSCH); and receiving the set of DMRSs using a set of resources determined based at least in part on the time domain resource pattern.

In some aspects, a method of wireless communication, performed by a base station (BS), may include determining a time domain resource pattern for a set of DMRSs, wherein the set of DMRSs is included in a Type-B PDSCH; and transmitting the set of DMRSs using a set of resources determined based at least in part on the time domain resource pattern.

In some aspects, a UE for wireless communication may include memory and one or more processors operatively coupled to the memory. The memory and the one or more processors may be configured to determine a time domain resource pattern for a set of DMRSs, wherein the set of DMRSs is included in a Type-B PDSCH; and receive the set of DMRSs using a set of resources determined based at least in part on the time domain resource pattern.

In some aspects, a BS for wireless communication may include memory and one or more processors operatively coupled to the memory. The memory and the one or more processors may be configured to determine a time domain resource pattern for a set of DMRSs, wherein the set of DMRSs is included in a Type-B PDSCH; and transmit the set of DMRSs using a set of resources determined based at least in part on the time domain resource pattern.

In some aspects, a non-transitory computer-readable medium may store one or more instructions for wireless communication. The one or more instructions, when executed by one or more processors of a UE, may cause the one or more processors to determine a time domain resource pattern for a set of DMRSs, wherein the set of DMRSs is included in a Type-B PDSCH; and receive the set of DMRSs using a set of resources determined based at least in part on the time domain resource pattern.

In some aspects, a non-transitory computer-readable medium may store one or more instructions for wireless communication. The one or more instructions, when executed by one or more processors of a BS, may cause the one or more processors to determine a time domain resource pattern for a set of DMRSs, wherein the set of DMRSs is included in a Type-B PDSCH; and transmit the set of DMRSs using a set of resources determined based at least in part on the time domain resource pattern.

In some aspects, an apparatus for wireless communication may include means for determining a time domain resource pattern for a set of DMRSs, wherein the set of DMRSs is included in a Type-B PDSCH; and means for receiving the set of DMRSs using a set of resources determined based at least in part on the time domain resource pattern.

In some aspects, an apparatus for wireless communication may include means for determining a time domain resource pattern for a set of DMRSs, wherein the set of DMRSs is included in a Type-B PDSCH; and means for transmitting the set of DMRSs using a set of resources determined based at least in part on the time domain resource pattern.

In some aspects, the time domain resource pattern is based at least in part on another time domain resource pattern of another uplink or downlink signal.

In some aspects, the time domain resource pattern is based at least in part on an interpolation-reduction rule or an extrapolation-reduction rule.

In some aspects, the time domain resource pattern is based at least in part on a first quantity of control resource set (CORESET) symbols and a second quantity of non-CORESET symbols.

In some aspects, the time domain resource pattern is based at least in part on a reference time domain resource pattern for another set of DMRSs included in a Type-B physical uplink shared channel (PUSCH).

In some aspects, the reference time domain resource pattern for the other set of DMRSs included in the Type-B PUSCH is based at least in part on a quantity of non-CORESET symbols.

In some aspects, the reference time domain resource pattern for the other set of DMRSs included in the Type-B PUSCH is based at least in part on a total quantity of symbols including CORESET symbols and non-CORESET symbols.

In some aspects, the time domain resource pattern is based at least in part on a shift applied to the reference time domain resource pattern.

In some aspects, the shift is based at least in part on a quantity of CORESET symbols.

In some aspects, a last DMRS from the set of DMRSs is dropped based at least in part on a quantity of non-CORESET symbols and a quantity of symbols of a DMRS of the set of DMRSs.

In some aspects, the time domain resource pattern includes a shift applied to a last DMRS of the set of DMRSs based at least in part on a PDSCH duration (in symbols), a quantity of DMRSs of the set of DMRSs, and a gap criterion between a first DMRS and a last DMRS of the set of DMRSs.

In some aspects, the time domain resource pattern includes a shift applied to a plurality of DMRSs of the set of DMRSs based at least in part on at least one of a quantity of non-CORESET symbols, a starting symbol of a sequence, an interpolation-reduction rule, an extrapolation-reduction rule, a gap criterion, or a symbol quantity criterion.

In some aspects, the determination of the time domain resource pattern includes determining the time domain resource pattern based at least in part on a stored data structure identifying the time domain resource pattern.

In some aspects, the determination of the time domain resource pattern includes determining the time domain resource pattern based at least in part on a time domain resource pattern generation procedure.

In some aspects, the time domain resource pattern includes a dropped DMRS that is configured for a symbol that is greater than a threshold quantity of symbols after a starting symbol of a sequence.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A-7E are diagrams illustrating examples of time domain resource pattern shifting, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
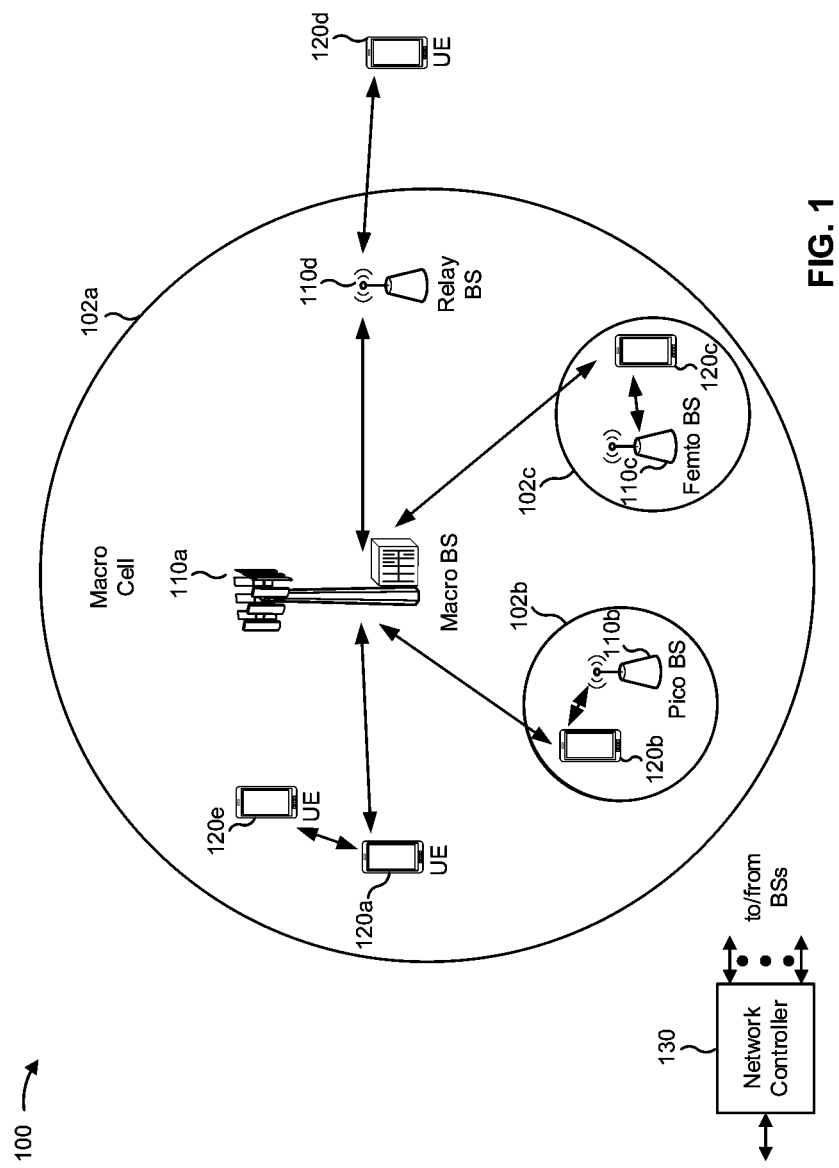
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations (relay BSs). A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
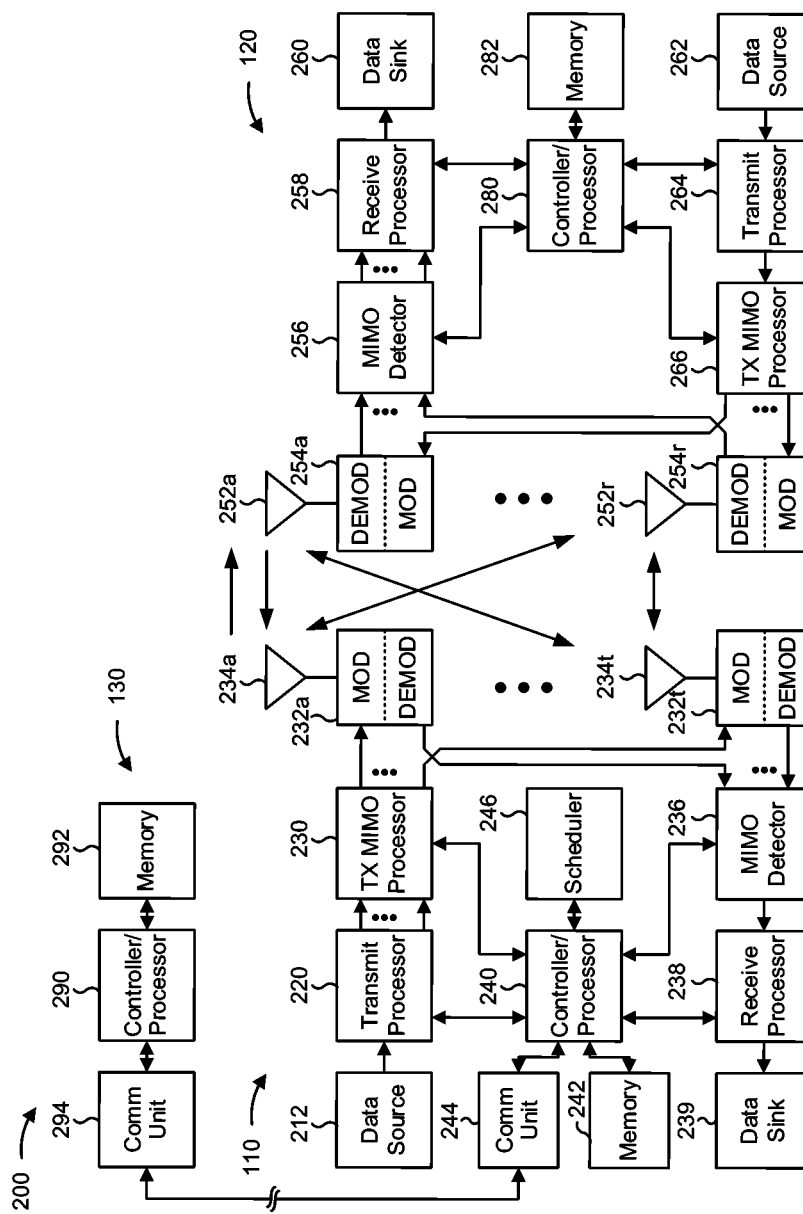
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with demodulation reference signal time domain pattern configuration, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, UE 120 may include means for determining a time domain resource pattern for a set of demodulation reference signals (DMRSs), wherein the set of DMRSs is included in a Type-B physical downlink shared channel (PDSCH), means for receiving the set of DMRSs using a set of resources determined based at least in part on the time domain resource pattern, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a time domain resource pattern for a set of DMRSs, wherein the set of DMRSs is included in a Type-B PDSCH, means for transmitting the set of DMRSs using a set of resources determined based at least in part on the time domain resource pattern, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

As described in more detail below, in some communications systems, such as NR, a time domain resource pattern may be defined for a DMRS. The time domain resource pattern may be identified using a start and length indicator vector (SLIV) that identifies a start symbol, S, and a length, L, for a sequence that includes at least one DMRS (e.g., L may be a length or duration of the sequence). As an example, a time domain resource pattern may be defined, for Type-B PUSCH, for each possible length of the Type-B PUSCH. In this case, Type-B PUSCH may have time domain resource patterns defined for a starting symbol, S={0, . . . , 13}, and a length, L={1, . . . , 14}, such that S+L≤14. Similarly, a Type-A PDSCH may be scheduled for a starting symbol, S={0, 1, 2, 3} and a length, L={3, . . . , 14}, such that 3≤S+L≤14. A device, such as a UE and/or a BS, may store a data structure, such as a lookup table, that may define DMRS locations for, for example, Type-A PDSCH, a Type-B PUSCH, and/or the like.

A Type-B PDSCH may be scheduled for a starting symbol, S={0, . . . , 12} and a length, L={2, 4, 7}, such that 2≤S+L≤14. In Type-B PDSCH, a single symbol DMRS may be supported for L=2 with the DMRS at symbol index, I={0, 1}. Similarly, for L=4, the single symbol DMRS may be at symbol index, I={0, 1}. Similarly, for L=7, the single symbol DMRS may be at symbol index, I={2, 3}. Double symbol (also referred to as "two symbol") DMRS may also be supported for Type-B PDSCH, such that L=7 and the symbol indices I={(0, 4), (1, 5)} for the two symbol DMRS.

However, other durations may be not be supported for Type-B PDSCH. Moreover, double symbol DMRS may not be supported for various durations of Type-B PDSCH. It may be advantageous to reuse existing channel estimate interpolation tables that may correspond to existing time domain resource patterns. However, using a Type-B PUSCH time domain resource pattern for Type-B PDSCH may not be sufficient for all use cases, because PDSCHs can have control resource set (CORESET) symbols at a start of a PDSCH, which does not occur for PUSCHs. Moreover, Type-B PUSCH time domain resource patterns may not satisfy criteria that are advantageous for Type-B PDSCH. For example, Type-B PUSCH time domain resource patterns may have DMRS gaps of greater than 8 symbols. Further, Type-B PUSCH time domain resource patterns may, when applied to Type-B PDSCH, have greater than a threshold quantity (e.g., greater than 2) of symbols that are to be extrapolated after a last DMRS of a sequence. Such characteristics may result in excess receiver complexity (e.g., UE complexity) to receive the DMRS and an associated Type-B PDSCH, which may result in excessive utilization of processing resources.

Thus, some aspects described herein define time domain resource patterns for quantities of symbols from 2 symbols to 13 symbols for Type-B PDSCH. Moreover, some aspects provide time domain resource patterns for double symbol DMRS for Type-B PDSCH. In some aspects, one or more criteria may be satisfied by time domain resource patterns defined herein for Type-B PDSCH, such as a DMRS gap of less than or equal to 8 symbols, a maximum quantity of symbols for extrapolation of less than or equal to 2 symbols, and/or the like. Although some aspects are described herein in terms of a procedural determination of a time domain resource pattern, other aspects are contemplated, such as a data structure (e.g., a lookup table) identifying a time domain resource pattern for a given set of parameters, as described herein.

In some aspects, a UE (e.g., UE 120) and/or a BS (e.g., BS 110) may determine a time domain resource pattern for a Type-B PDSCH with lengths of L={5, 13} based at least in part on other uplink or downlink time domain patterns described herein such as Type-A PDSCH, Type-B PUSCH, and/or the like. In this case, the UE and/or the BS may shift the other uplink or downlink time domain resource patterns, as described herein, to minimize interpolation and/or extrapolation by the UE. In some aspects, the UE and/or the BS may use a set of rules to determine the time domain resource pattern. As an example, for a Type-B PDSCH with J CORESET symbols and K non-CORESET symbols, such that J+K=L (e.g., where L is the duration of the Type-B PDSCH), the UE and/or the BS may select a Type-B PUSCH time domain resource pattern with K symbols, and shift the Type-B PUSCH time domain resource pattern by the J CORESET symbols to determine a Type-B PDSCH time domain resource pattern.

As another example, when there are K=5 non-CORESET symbols, and 2 single symbol DMRSs are configured, the BS and/or the UE may drop a last DMRS of the 2 single symbol DMRSs. As another example, when there are K=12 non-CORESET symbols, and a quantity of single symbol DMRSs is greater than 1, the BS and/or the UE may shift a last DMRS symbol to ensure a DMRS gap of less than or equal to 8 symbols, thereby satisfying an interpolation-reduction criterion and enabling use of a Type-A PDSCH channel estimation interpolation matrix, as described herein. As another example, when there are K=13 non-CORESET symbols, and a quantity of configured DMRSs is greater than 1, a first one or more DMRS symbols may be shifted to satisfy the interpolation-reduction criterion and the extrapolation-reduction criterion, but resulting in a non-frontloaded DMRS (e.g., the first DMRS of the set of DMRSs comes after the first non-CORESET symbol).

FIGS. 3A-3E are examples 300-340 of time domain resource patterns for DMRSs. A time domain resource pattern may define a position of the DMRSs with respect to, for example, a CORESET symbol, a PDSCH without a DMRS, a non-PDSCH symbol, and/or the like, as shown in FIGS. 3A-3E.

Figure 3A:
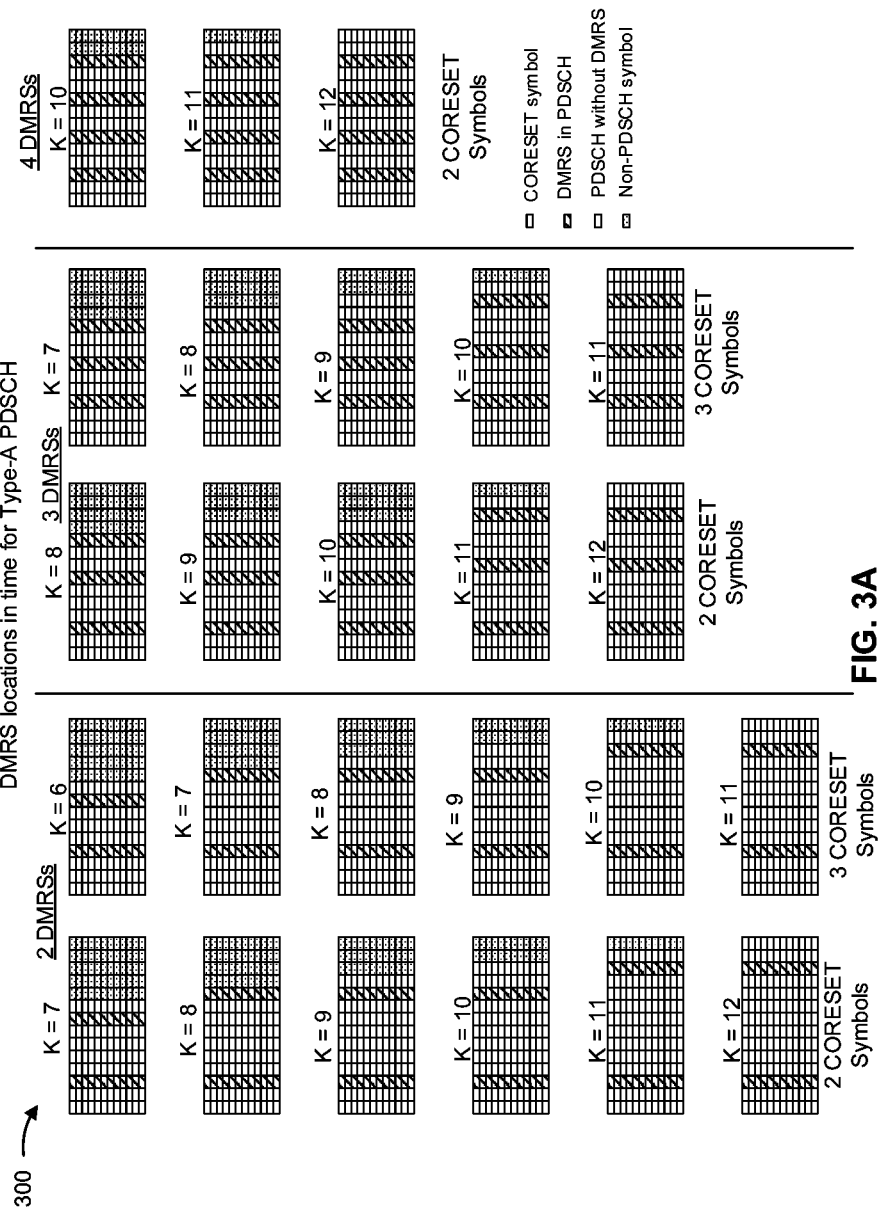
FIGS. 3A-3E are diagrams illustrating examples of time domain resource patterns for DMRSs, in accordance with various aspects of the present disclosure.

As shown in FIG. 3A, and by example 300, a set of time domain resource patterns is defined for Type-A PDSCH single symbol DMRS. For example, a first set of time domain resource patterns is defined for 2 DMRSs in a Type-A PDSCH with 2 CORESET symbols or 3 CORESET symbols, and with non-CORESET symbols, K, of 7 to 12 symbols and 6 to 11 symbols, respectively. Similarly, a second set of time domain resource patterns is defined for 3 DMRSs in a Type-A PDSCH with 2 CORESET symbols or 3 CORESET symbols, and with non-CORESET symbols, K, of 8 to 12 symbols and 7 to 11 symbols, respectively. Similarly, a first set of time domain resource patterns is defined for 4 DMRSs in a Type-A PDSCH with 2 CORESET symbols, and with non-CORESET symbols, K, of 10 to 12 symbols. As shown, in the time domain resource location patterns, some symbols are not assigned for the PDSCH.

Figure 3B:
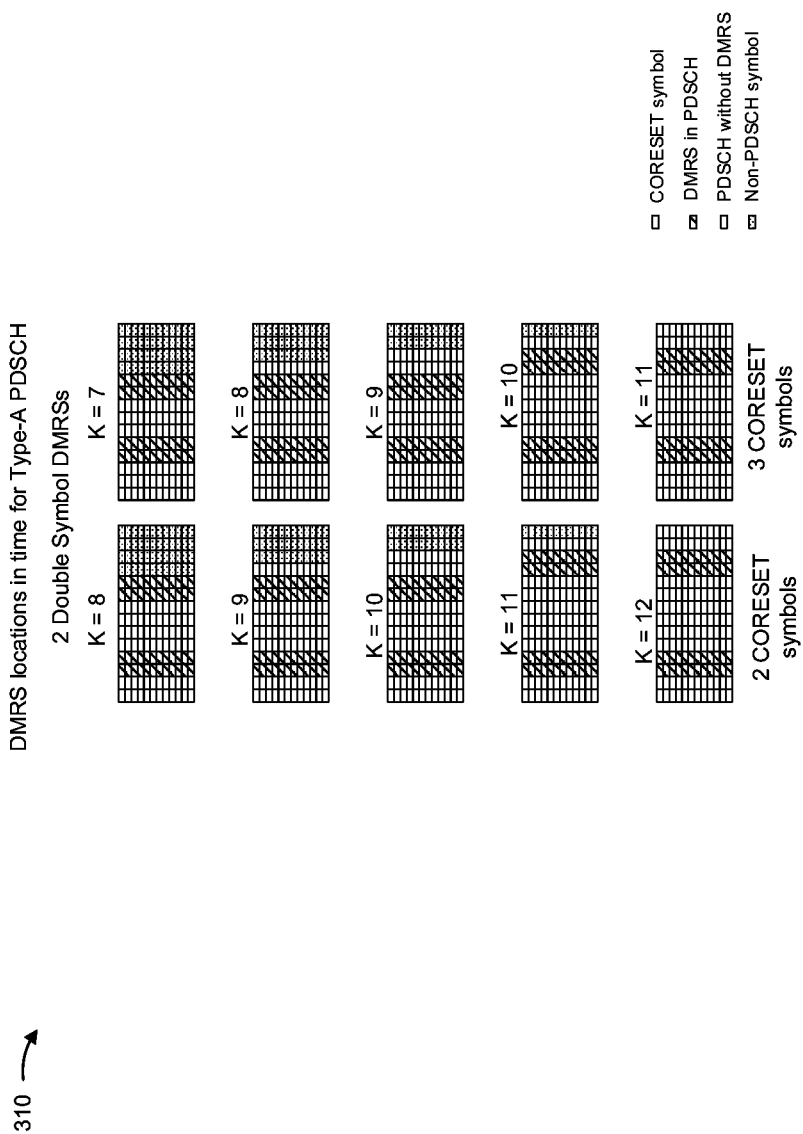

As shown in FIG. 3B, and by example 310, a set of time domain resource patterns is defined for Type-A PDSCH double symbol DMRS. For example, a set of time domain resource patterns is defined for 2 DMRSs in a Type-A PDSCH with 2 CORESET symbols or 3 CORESET symbols, and with non-CORESET symbols, K, of 8 to 12 symbols and 7 to 11 symbols, respectively.

Figure 3C:
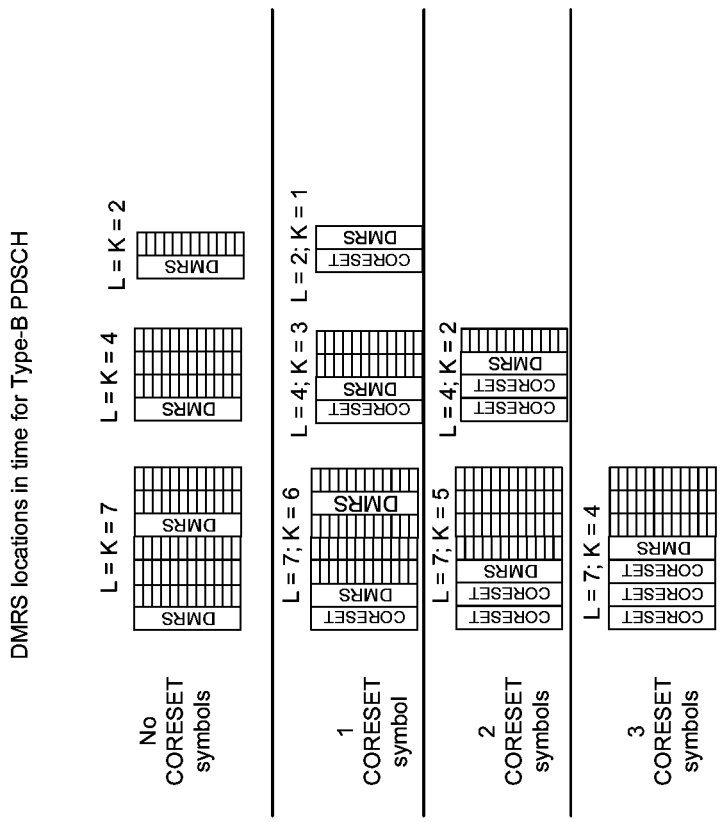

As shown in FIG. 3C, and by example 320, a set of time domain resource patterns is defined for Type-B PDSCH single symbol DMRS. For example, a first set of time domain resource patterns is defined for a Type-B PDSCH without CORESET symbols and lengths L (and quantities of non-CORESET symbols K), of 7, 4, and 2. In this case, for the first length, the time domain resource pattern may include two DMRSs, and for the second and third lengths, the time domain resource patterns may include one DMRS. Similarly, a second set of time domain resource patterns is defined for 1 CORESET symbol and lengths L of 7, 4, and 2, and quantities of non-CORESET symbols K of 6, 3, and 1, respectively. In this case, for the first length, the time domain resource pattern may include two DMRSs, and for the second and third lengths, the time domain resource patterns may include one DMRS. Similarly, a third set of time domain resource patterns is defined for 2 CORESET symbols and lengths L of 7 and 4, and quantities of non-CORESET symbols K of 5 and 2, respectively. In this case, for the first and second lengths, the time domain resource pattern may include one DMRS. Similarly, a fourth set of time domain resource patterns is defined for 3 CORESET symbols and a length L of 4 symbols, and a quantity of non-CORESET symbols K of 4. In this case, the time domain resource pattern may include one DMRS.

Figure 3D:
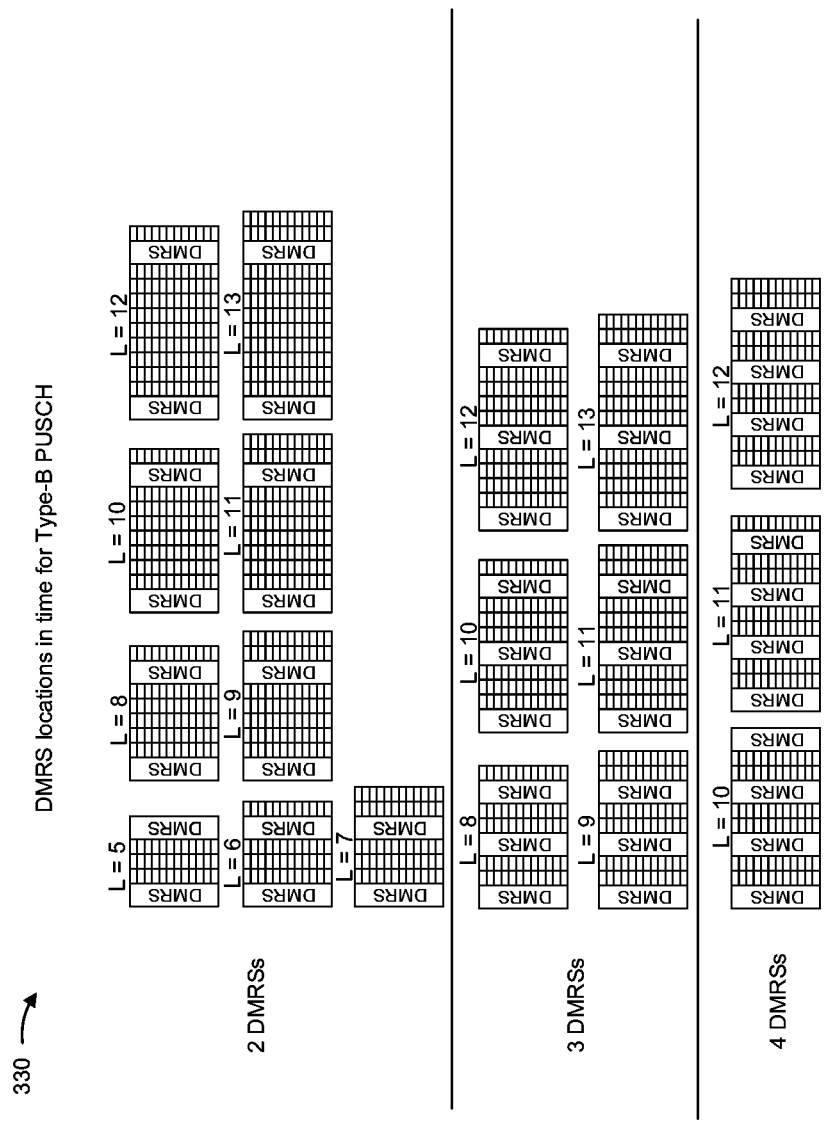

As shown in FIG. 3D, and by example 330, a set of time domain resource patterns is defined for Type-B PUSCH single symbol DMRS. For example, a first set of time domain resource patterns is defined for 2 DMRSs in a Type-A PUSCH with lengths L of 5 to 13 symbols. Similarly, a second set of time domain resource patterns is defined for 3 DMRSs in a Type-B PUSCH with lengths L of 8 to 13 symbols. Similarly, a third set of time domain resource patterns is defined for 4 DMRSs in a Type-B PUSCH with lengths L of 10 to 12 symbols.

Figure 3E:
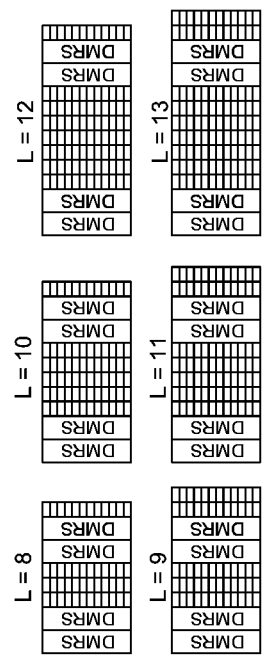

As shown in FIG. 3E, and by example 340, a set of time domain resource patterns is defined for Type-B PUSCH double symbol DMRS. For example, a set of time domain resource patterns is defined for 2 DMRSs in a Type-B PUSCH with lengths L of 8 to 13 symbols.

As indicated above, FIGS. 3A-3E are provided as examples. Other examples may differ from what is described with respect to FIGS. 3A-3E.

Figure 4:
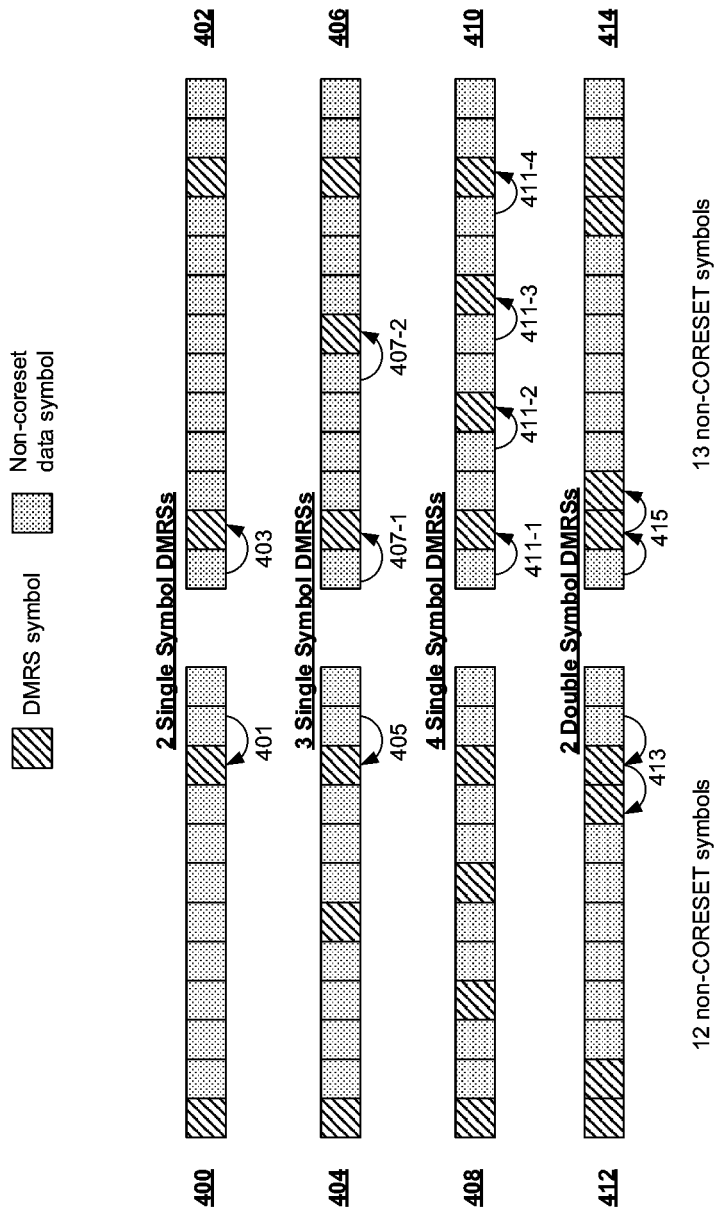
FIG. 4 is a diagram illustrating examples of time domain resource patterns for DMRSs, in accordance with various aspects of the present disclosure.

FIG. 4 is a set of examples 400-414 of a set of time domain resource patterns for Type-B PDSCH. As shown in FIG. 4, the set of time domain resource patterns may be for lengths 12 and 13.

As shown in FIG. 4, and by example 400, a time domain resource pattern for Type-B PDSCH with 2 single symbol DMRSs and a length L of 12 symbols may be defined based at least in part on a shift relative to a Type-B PUSCH time domain resource pattern, as described above. In some aspects, the 2 DMRSs may be at locations {m, m+9}, where m is a first non-CORESET PDSCH symbol. For example, as shown by reference number 401, a last DMRS of the time domain resource pattern is shifted to an earlier symbol relative to a Type-B PUSCH time domain resource pattern. Similarly, as shown by example 402, a time domain resource pattern for Type-B PDSCH with 2 single symbol DMRSs and length L of 13 symbols may be defined based at least in part on a shift relative to a Type-B PUSCH time domain resource pattern, as described above. In some aspects, the 2 DMRSs may be at locations {m+1, m+10}, where m is a first non-CORESET PDSCH symbol. For example, as shown by reference number 403, a first DMRS of the time domain resource pattern is shifted to a later symbol relative to a Type-B PUSCH time domain resource pattern.

As further shown in FIG. 4, and by example 404, a time domain resource pattern for Type-B PDSCH with 3 single symbol DMRSs and a length L of 12 symbols may be defined based at least in part on a shift relative to a Type-B PUSCH time domain resource pattern, as described above. In some aspects, the 3 DMRSs may be at locations {m, m+5, m+9}, where m is a first non-CORESET PDSCH symbol. For example, as shown by reference number 405, a last DMRS of the time domain resource pattern is shifted to an earlier symbol relative to a Type-B PUSCH time domain resource pattern. In this way, a Type-B PDSCH time domain resource pattern is defined that enables a receiver (e.g., UE 120) to reuse a Type-A PDSCH channel estimate interpolation/extrapolation matrix, thereby reducing memory utilization. Moreover, by shifting the last DMRS symbol, the Type-B PDSCH time domain resource pattern remains front-loaded (e.g., includes a DMRS in a sequentially first symbol), thereby reducing latency.

Similarly, as shown by example 406, a time domain resource pattern for Type-B PDSCH with 3 single symbol DMRSs and a length L of 13 symbols may be defined based at least in part on a shift relative to a Type-B PUSCH time domain resource pattern, as described above. In some aspects, the 3 DMRSs may be at locations {m+1, m+6, m+10}, where m is a first non-CORESET PDSCH symbol. For example, as shown by reference numbers 407-1 and 407-2, a first DMRS and a second DMRS of the time domain resource pattern are each shifted to a later symbol relative to a Type-B PUSCH time domain resource pattern. In this way, a Type-B PDSCH time domain resource pattern is defined that enables a receiver (e.g., UE 120) to reuse a Type-A PDSCH channel estimate interpolation matrix, thereby reducing memory utilization.

As further shown in FIG. 4, and by example 408, a time domain resource pattern for Type-B PDSCH with 4 single symbol DMRSs and a length L of 12 symbols may be defined without a shift relative to a Type-B PUSCH time domain resource pattern, as described above. In some aspects, the 4 DMRSs may be at locations {m, m+3, m+5, m+9}, where m is a first non-CORESET PDSCH symbol. In contrast, as shown by example 410, a second time domain resource pattern for Type-B PDSCH with 4 single symbol DMRSs of a length L of 13 symbols may be defined based at least in part on a shift relative to a Type-B PUSCH time domain resource pattern, as described above. In some aspects, the 4 DMRSs may be at locations {m+1, m+4, m+7, m+10}, where m is a first non-CORESET PDSCH symbol. For example, as shown by reference numbers 411-1, 411-2, 411-3, and 411-4, each DMRS of the time domain resource pattern is shifted to a later symbol relative to a Type-B PUSCH time domain resource pattern. In this way, a Type-B PDSCH time domain resource pattern is defined that enables a receiver (e.g., UE 120) to reuse a Type-A PDSCH channel estimate interpolation matrix, thereby reducing memory utilization.

As further shown in FIG. 4, and by example 412, a time domain resource pattern for Type-B PDSCH with 2 double symbol DMRSs and a length L of 12 symbols may be defined based at least in part on a shift relative to a Type-B PUSCH time domain resource pattern, as described above. In some aspects, the 2 double symbol DMRS may be at locations {m, m+1, m+8, m+9}, where m is a first non-CORESET PDSCH symbol. For example, as shown by reference number 413, symbols of a last DMRS of the time domain resource pattern are shifted to earlier symbols relative to a Type-B PUSCH time domain resource pattern. Similarly, as shown by example 414, a time domain resource pattern for Type-B PDSCH with 2 double symbol DMRSs and a length L of 13 symbols may be defined based at least in part on a shift relative to a Type-B PUSCH time domain resource pattern, as described above. In some aspects, the 2 double symbol DMRS may be at locations {m+1, m+2, m+9, m+10}, where m is a first non-CORESET PDSCH symbol. For example, as shown by reference number 415, the first two DMRS symbols of the second time domain resource pattern are shifted to later symbols relative to a Type-B PUSCH time domain resource pattern.

As indicated above, FIG. 4 depicts examples. Other examples may differ from what is described with respect to FIG. 4.

Figure 5:
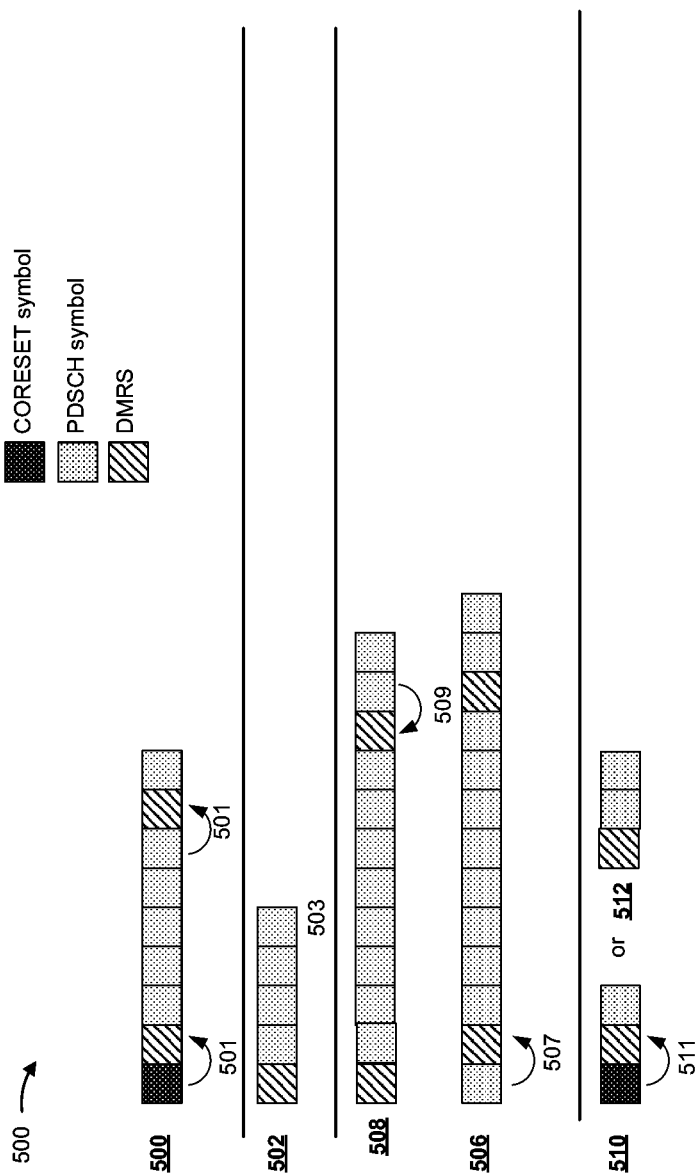
FIG. 5 is a diagram illustrating examples of time domain resource patterns for DMRSs, in accordance with various aspects of the present disclosure.

FIG. 5 is a set of examples 500-512 of a set of time domain resource patterns for Type-B PDSCH.

As shown in FIG. 5, and by example 500, a time domain resource pattern for Type-B PDSCH with 2 single symbol DMRSs and length L of 9 symbols may be defined based at least in part on a shift relative to a Type-B PUSCH time domain resource pattern (e.g., an 8 symbol Type-B PUSCH time domain resource pattern), as described above. For example, as shown by reference number 501, the DMRSs of the first time domain resource pattern are shifted to a later symbol relative to a Type-B PUSCH time domain resource pattern, to accommodate a CORESET symbol at a start of the Type-B PDSCH.

As further shown in FIG. 5, and by example 502, a time domain resource pattern for Type-B PDSCH with 1 single symbol DMRS and a length L of 5 symbols may be defined based at least in part on dropping a DMRS relative to a Type-B PUSCH time domain resource pattern (e.g., a 5 symbol Type-B PUSCH time domain resource pattern), as described above. For example, as shown by reference number 503, a last DMRS of the Type-B PUSCH time domain resource pattern may be dropped (or replaced by a PDSCH data symbol) to accommodate a PDSCH symbol in the time domain resource pattern for Type-B PDSCH. In this case, even if 2 single symbol DMRSs are configured, only the first front-loaded DMRS is retained.

As further shown in FIG. 5, and by examples 506 and 508, a set of time domain resource patterns for Type-B PDSCH with 2 single symbol DMRSs with a DMRS gap of 9 symbols may be defined based at least in part on a shift relative to a Type-B PUSCH time domain resource pattern, as described above. For example, as shown by example 508 and by reference number 509, for a length 12, a last DMRS is shifted to an earlier symbol relative to a Type-B PUSCH time domain resource pattern. By using shifted versions of Type-B PUSCH time domain resource patterns for the Type-B PDSCH patterns, a receiver (e.g., UE 120) may use the same interpolation/extrapolation matrices for channel estimation when using a Type-B PDSCH pattern as when using a Type-A PDSCH time domain resource pattern, thereby reducing utilization of memory resources.

As further shown in FIG. 5, and by examples 510 and 512, time domain resource patterns for Type-B PDSCH with 1 single symbol DMRS and length L of 3 symbols may be defined. For example, as shown by reference number 511, a first DMRS of a first time domain resource pattern is shifted to a later symbol relative to a Type-B PUSCH time domain resource pattern to accommodate a CORESET symbol at a start of the Type-B PDSCH. In contrast, when there is no CORESET symbol at the start of the Type-B PDSCH, the DMRS may be in a first symbol of a second time domain resource pattern, as shown in example 512.

As indicated above, FIG. 5 is provided as examples. Other examples may differ from what is described with respect to FIG. 5.

Figure 6:
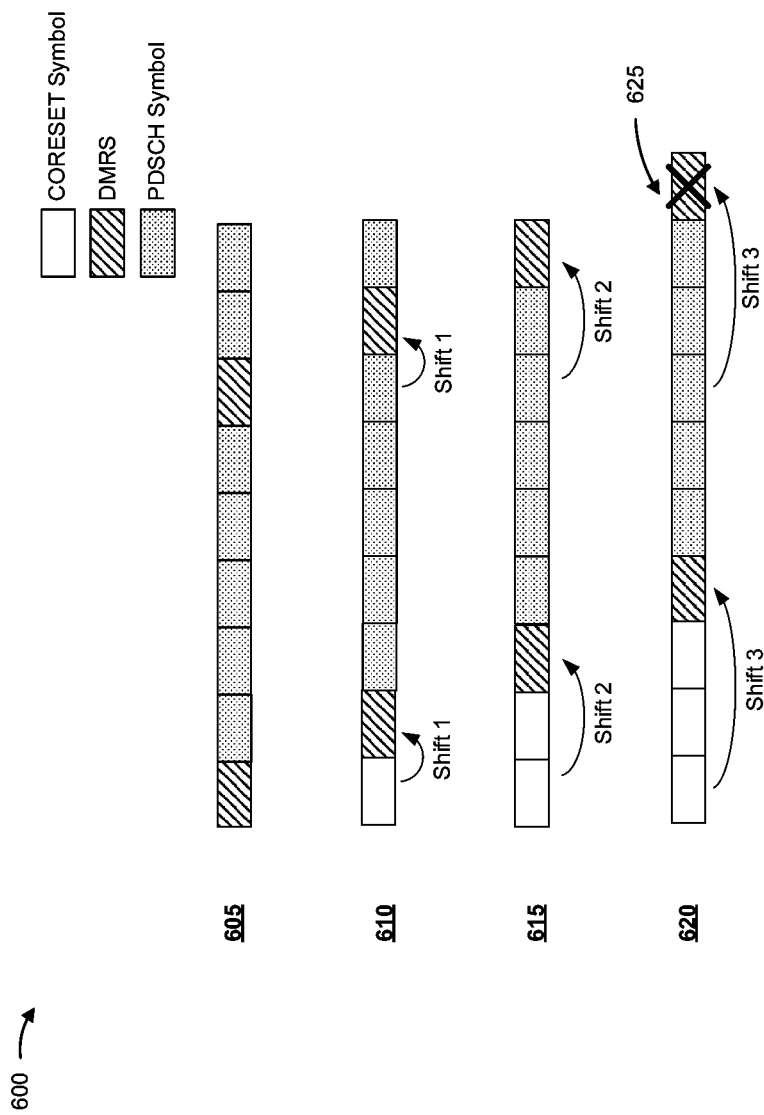
FIG. 6 is a diagram illustrating an example of time domain resource pattern shifting, in accordance with various aspects of the present disclosure.

FIG. 6 is an example 600 of time domain resource pattern shifting. For example, UE 120 or BS 110 may shift a DMRS pilot pattern to define a time domain resource pattern for Type-B PDSCH. As described above, although some aspects are described in terms of a set of steps, UE 120 and/or BS 110 may use stored information, such as a stored lookup table, to determine a time domain resource pattern. As shown in FIG. 6, example 600 is a Type-B PDSCH with a length L of 9 symbols and with 2 DMRSs configured.

In some aspects, to determine a DMRS pattern, a device (e.g., a BS 110 and/or a UE 120) may select a DMRS pilot pattern for a particular length (e.g., 9 symbols) and a particular quantity of DMRSs (e.g., 2 DMRSs) configured without considering a CORESET symbol present. After the DMRS pilot pattern is selected, all DMRS positions are shifted based at least in part on a quantity of CORESET symbols that are actually present. For example, in time domain resource pattern 605, no shift is performed, as no CORESET symbol is present. In contrast, in time domain resource pattern 610, a shift of 1 symbol is performed, as 1 CORESET symbol is present. Similarly, in time domain resource patterns 615 and 620, a shift of 2 symbols (e.g., for 2 CORESET symbols) and 3 symbols (e.g., for 3 CORESET symbols) is performed, respectively. After shifting the DMRS symbols, if a PDSCH symbol is not available for a DMRS, as shown by reference number 625 with regard to time domain resource pattern 620, a DMRS is dropped from the time domain resource pattern. Although described in terms of dropping a DMRS that extends past a length of the Type-B PDSCH, in some aspects, a DMRS may be dropped if the DMRS is shifted to a last symbol, a second-to-last symbol, and/or the like.

As indicated above, FIG. 6 is provided as an example. Other examples may differ from what is described with respect to FIG. 6.

FIGS. 7A-7E are examples 700-740 of time domain resource pattern shifting. Although some aspects are described in terms of a set of procedural steps, a device (e.g., UE 120 and/or BS 110) may use a stored data structure to determine a time domain resource pattern defined in accordance with examples 700-740.

Figure 7A:
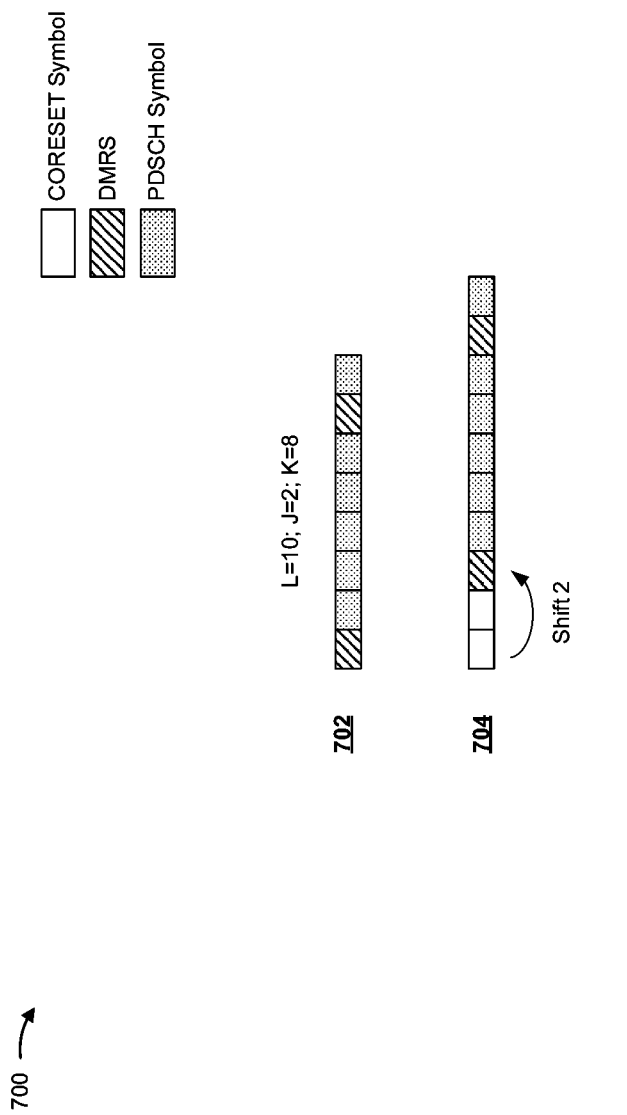

As shown in FIG. 7A, example 700 is associated with a Type-B PDSCH of total length, L, of 10, a quantity of CORESET symbols (symbols in the allocation which overlap with a CORESET), J, of 2, and a quantity of non-CORESET symbols (symbols in the allocation not overlapping with any CORESET symbol), K, of 8. In this case, in step 702, a device (e.g., UE 120 and/or BS 110) may select a Type-B PUSCH time domain resource pattern based at least in part on the quantity of non-CORESET symbols (e.g., 8 symbols). Further, in step 704, the device may shift the DMRSs of the Type-B PUSCH time domain resource pattern by a quantity of CORESET symbols (e.g., 2 CORESET symbols) to determine a Type-B PDSCH time domain resource pattern.

As shown in FIG. 7B, example 710 is associated with a Type-B PDSCH of total length, L, of 13, a quantity of CORESET symbols, J, of 1, and a quantity of non-CORESET symbols, K, of 12. In this case, in step 712, a device (e.g., UE 120 or BS 110) may select a Type-B PUSCH time domain resource pattern based at least in part on the quantity of non-CORESET symbols (e.g., 12 symbols). Further, in step 714, based at least in part on a DMRS gap being greater than a threshold amount (e.g., greater than 8 symbols), the device may shift the last DMRS to an earlier symbol. Further, in step 716, the device may shift the DMRSs of the Type-B PUSCH time domain resource pattern by a quantity of CORESET symbols (e.g., 1 CORESET symbol) to determine a Type-B PDSCH time domain resource pattern.

Figure 7C:
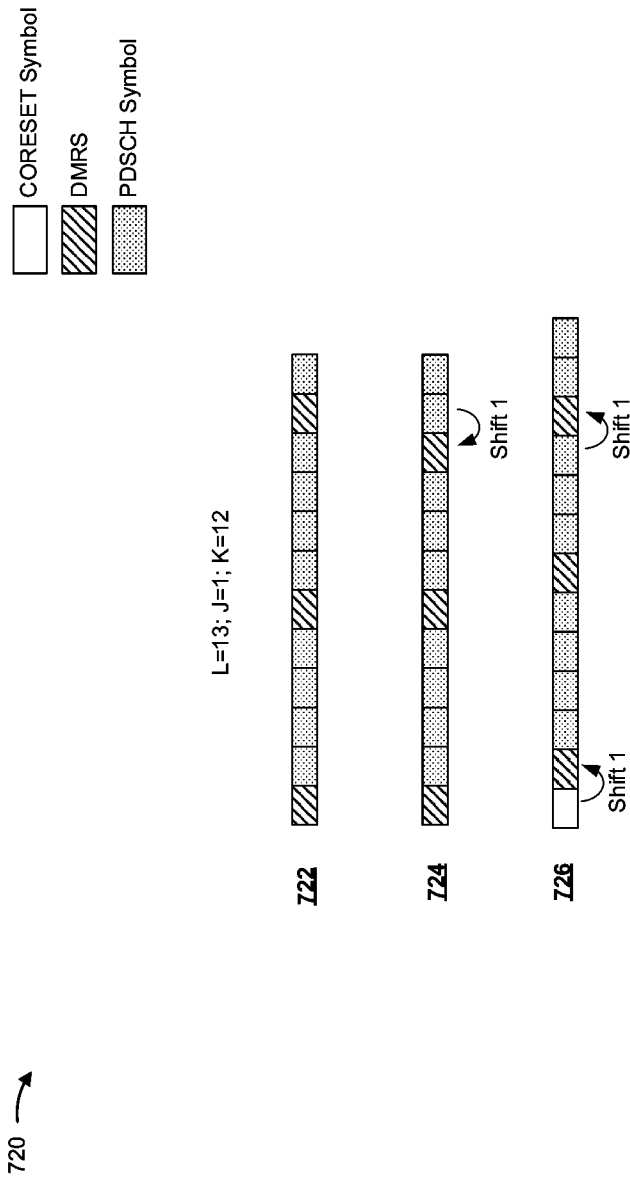

As shown in FIG. 7C, example 720 is associated with a Type-B PDSCH of total length, L, of 13, a quantity of CORESET symbols, J, of 1, and a quantity of non-CORESET symbols, K, of 12. In this case, the Type-B PDSCH is configured for 3 DMRSs. As shown, in step 722, a device (e.g., UE 120 or BS 110) may select a Type-B PUSCH time domain resource pattern based at least in part on the quantity of non-CORESET symbols (e.g., 12 symbols) and based at least in part on the quantity of DMRSs. Further, in step 724, based at least in part on a DMRS gap between the first DMRS and the last DMRS being greater than a threshold amount (e.g., greater than 8 symbols), the device may shift the last DMRS to an earlier symbol. Further, in step 726, the device may shift the DMRSs of the Type-B PUSCH time domain resource pattern by a quantity of CORESET symbols (e.g., 1 CORESET symbol) to determine a Type-B PDSCH time domain resource pattern.

Figure 7D:
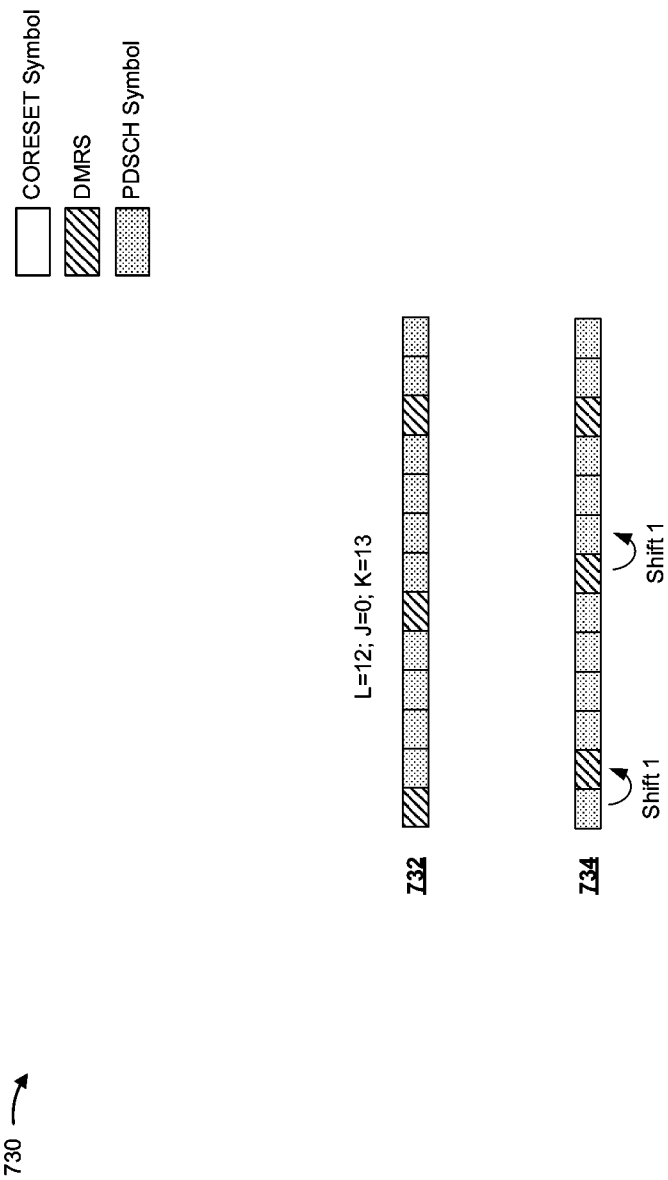

As shown in FIG. 7D, example 730 is associated with a Type-B PDSCH of total length, L, of 12, a quantity of CORESET symbols, J, of 0, and a quantity of non-CORESET symbols, K, of 13. In this case, the Type-B PDSCH is configured for 3 DMRSs. As shown, in step 732, a device (e.g., UE 120 or BS 110) may select a Type-B PUSCH time domain resource pattern based at least in part on the quantity of non-CORESET symbols (e.g., 8 symbols). In this case, a DMRS gap between the first DMRS and the last DMRS is greater than a threshold (e.g., greater than 8 symbols), but shifting the last DMRS earlier would result in greater than a threshold quantity of symbols for extrapolation (e.g., greater than 2 symbols). Thus, in step 734, the device may shift the first two DMRSs of the Type-B PUSCH time domain resource pattern to respective later symbols to ensure that the DMRS gap is less than or equal to the threshold.

Figure 7E:
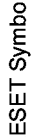
Figure 7E:
Figure 7E:
Figure 7E:
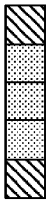
Figure 7E:
Figure 7E:
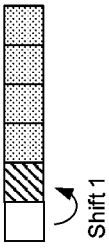

As shown in FIG. 7E, example 740 is associated with a Type-B PDSCH of total length, L, of 6, a quantity of CORESET symbols, J, of 1, and a quantity of Non-CORESET symbols, K, of 5. In this case, the Type-B PDSCH is configured for 2 DMRSs. As shown, in step 742, a device (e.g., UE 120 or BS 110) may select a Type-B PUSCH time domain resource pattern based at least in part on the quantity of non-CORESET symbols (e.g., 5 symbols) and based at least in part on the quantity of DMRSs. Further, in step 744, as there is not an equivalent Type-A PDSCH time domain resource pattern, the device may convert the last DMRS to a PDSCH symbol. In this way, the device reduces receiver (e.g., UE 120) complexity, thereby reducing a utilization of processing resources by the receiver (e.g., UE 120). Further, in step 746, the device may shift the remaining DMRS of the Type-B PUSCH time domain resource pattern by a quantity of CORESET symbols (e.g., 1 CORESET symbol) to determine a Type-B PDSCH time domain resource pattern.

As indicated above, FIGS. 7A-7E are provided as examples. Other examples may differ from what is described with respect to FIGS. 7A-7E.

Figure 8:
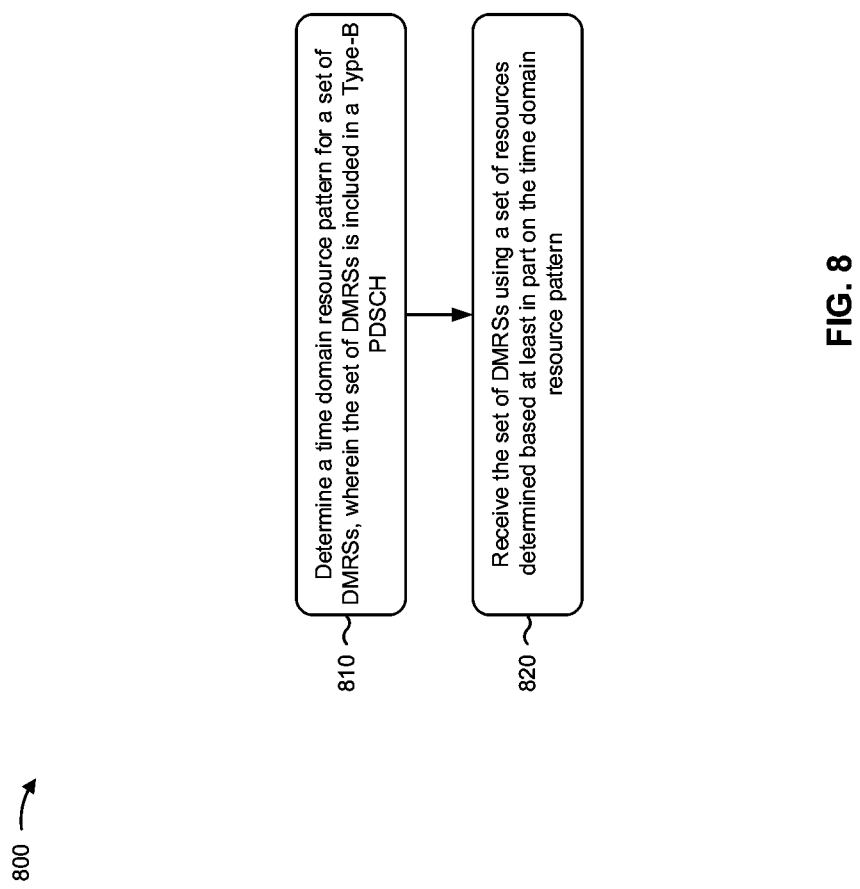
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120, apparatus 1002, UE 1150, and/or the like) performs operations associated with techniques for DMRS time domain pattern configuration.

As shown in FIG. 8, in some aspects, process 800 may include determining a time domain resource pattern for a set of DMRSs, wherein the set of DMRSs is included in a Type-B PDSCH (block 810). For example, the UE (e.g., using receive processor 258, transmit processor 264, controller/processor 280, memory 282, and/or the like) may determine a time domain resource pattern for a set of DMRSs, as described above. In some aspects, the set of DMRSs is included in a Type-B PDSCH.

As further shown in FIG. 8, in some aspects, process 800 may include receiving the set of DMRSs using a set of resources determined based at least in part on the time domain resource pattern (block 820). For example, the UE (e.g., using receive processor 258, transmit processor 264, controller/processor 280, memory 282, and/or the like) may receive the set of DMRSs using a set of resources determined based at least in part on the time domain resource pattern, as described above.

Process 800 may include additional aspects, such as any single aspect or any combination of aspects described below and/or in connection with one or more other processes described elsewhere herein.

In a first aspect, the time domain resource pattern is based at least in part on another time domain resource pattern of another uplink or downlink signal.

In a second aspect, alone or in combination with the first aspect, the time domain resource pattern is based at least in part on an interpolation-reduction rule or an extrapolation-reduction rule.

In a third aspect, alone or in combination with one or more of the first and second aspects, the time domain resource pattern is based at least in part on a first quantity of CORESET symbols and a second quantity of non-CORESET symbols.

In a fourth aspect, alone or in combination with one or more of the first through third aspects, the time domain resource pattern is based at least in part on a reference time domain resource pattern for another set of DMRSs included in a Type-B PUSCH.

In a fifth aspect, alone or in combination with one or more of the first through fourth aspects, the reference time domain resource pattern for the other set of DMRSs included in the Type-B PUSCH is based at least in part on a quantity of non-CORESET symbols.

In a sixth aspect, alone or in combination with one or more of the first through fifth aspects, the reference time domain resource pattern for the other set of DMRSs included in the Type-B PUSCH is based at least in part on a total quantity of symbols, including CORESET symbols and non-CORESET symbols.

In a seventh aspect, alone or in combination with one or more of the first through sixth aspects, the time domain resource pattern is based at least in part on a shift applied to the reference time domain resource pattern.

In an eighth aspect, alone or in combination with one or more of the first through seventh aspects, the shift is based at least in part on a quantity of CORESET symbols.

In a ninth aspect, alone or in combination with one or more of the first through eighth aspects, a last DMRS from the set of DMRSs is dropped based at least in part on a quantity of non-CORESET symbols and a quantity of symbols of DMRS of the set of DMRSs.

In a tenth aspect, alone or in combination with one or more of the first through ninth aspects, the time domain resource pattern includes a shift applied to a last DMRS of the set of DMRSs based at least in part on a PDSCH duration (in symbols), a quantity of DMRSs of the set of DMRSs, and a gap criterion between a first DMRS and a last DMRS of the set of DMRSs. In some aspects, the gap criterion between the first DMRS and the last DMRS is less than or equal to 9 symbols.

In an eleventh aspect, alone or in combination with one or more of the first through tenth aspects, the time domain resource pattern includes a shift applied to a plurality of DMRSs of the set of DMRSs based at least in part on at least one of a quantity of non-CORESET symbols, a starting symbol of a sequence, an interpolation-reduction rule, an extrapolation-reduction rule, a gap criterion, or a symbol quantity criterion.

In a twelfth aspect, alone or in combination with one or more of the first through eleventh aspects, the determination of the time domain resource pattern includes determining the time domain resource pattern based at least in part on a stored data structure identifying the time domain resource pattern.

In a thirteenth aspect, alone or in combination with one or more of the first through twelfth aspects, the determination of the time domain resource pattern includes determining the time domain resource pattern based at least in part on a time domain resource pattern generation procedure.

In a fourteenth aspect, alone or in combination with one or more of the first through thirteenth aspects, the time domain resource pattern includes a dropped DMRS that is configured for a symbol that is greater than a threshold quantity of symbols after a starting symbol of a sequence or of an allocation for the Type-B PDSCH.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
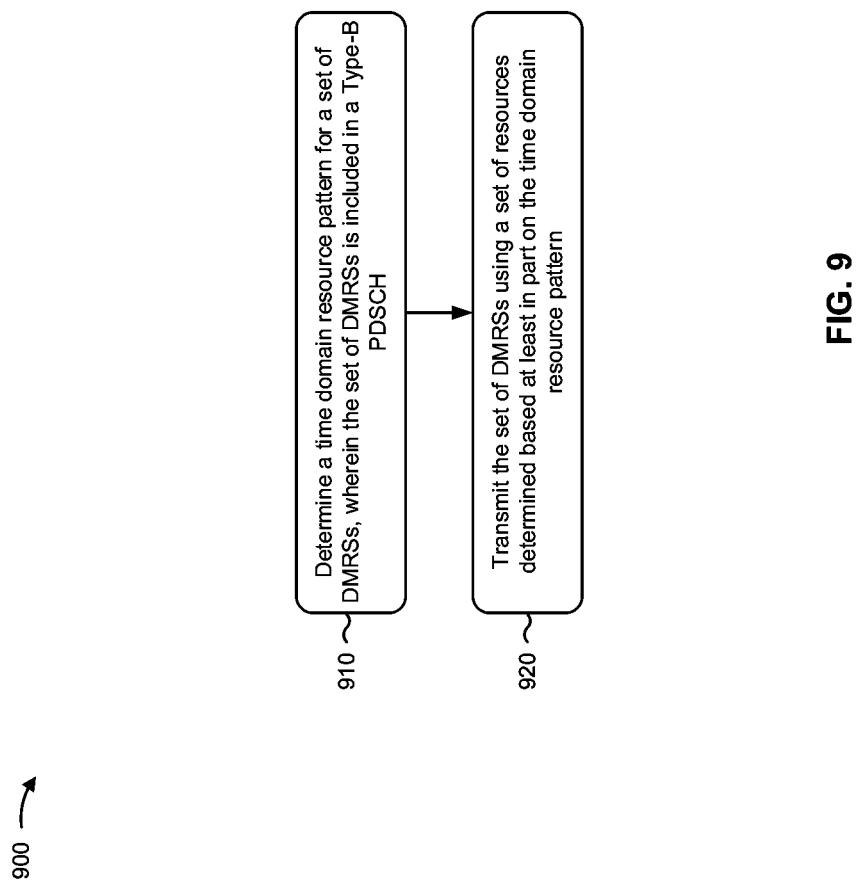
FIG. 9 is a diagram illustrating an example process performed, for example, by a base station, in accordance with various aspects of the present disclosure.

FIG. 9 is a diagram illustrating an example process 900 performed, for example, by a BS, in accordance with various aspects of the present disclosure. Example process 900 is an example where a BS (e.g., BS 110, BS 1050, apparatus 1102, and/or the like) performs operations associated with techniques for demodulation reference signal time domain pattern configuration.

As shown in FIG. 9, in some aspects, process 900 may include determining a time domain resource pattern for a set of DMRSs, wherein the set of DMRSs is included in a Type-B PDSCH (block 910). For example, the BS (e.g., using transmit processor 220, receive processor 238, controller/processor 240, memory 242, and/or the like) may determine a time domain resource pattern for a set of DMRSs, as described above. In some aspects, the set of DMRSs is included in a Type-B PDSCH.

As further shown in FIG. 9, in some aspects, process 900 may include transmitting the set of DMRSs using a set of resources determined based at least in part on the time domain resource pattern (block 920). For example, the BS (e.g., using transmit processor 220, receive processor 238, controller/processor 240, memory 242, and/or the like) may transmit the set of DMRSs using a set of resources determined based at least in part on the time domain resource pattern, as described above.

Process 900 may include additional aspects, such as any single aspect or any combination of aspects described below and/or in connection with one or more other processes described elsewhere herein.

In a first aspect, the time domain resource pattern is based at least in part on another time domain resource pattern of another uplink or downlink signal.

In a second aspect, alone or in combination with the first aspect, the time domain resource pattern is based at least in part on an interpolation-reduction rule or an extrapolation-reduction rule.

In a third aspect, alone or in combination with one or more of the first and second aspects, the time domain resource pattern is based at least in part on a first quantity of CORESET symbols and a second quantity of non-CORESET symbols.

In a fourth aspect, alone or in combination with one or more of the first through third aspects, the time domain resource pattern is based at least in part on a reference time domain resource pattern for another set of DMRSs included in a Type-B PUSCH.

In a fifth aspect, alone or in combination with one or more of the first through fourth aspects, the reference time domain resource pattern for the other set of DMRSs included in the Type-B PUSCH is based at least in part on a quantity of non-CORESET symbols.

In a sixth aspect, alone or in combination with one or more of the first through fifth aspects, the reference time domain resource pattern for the other set of DMRSs included in the Type-B PUSCH is based at least in part on a total quantity of symbols, including CORESET symbols and non-CORESET symbols.

In a seventh aspect, alone or in combination with one or more of the first through sixth aspects, the time domain resource pattern is based at least in part on a shift applied to the reference time domain resource pattern.

In an eighth aspect, alone or in combination with one or more of the first through seventh aspects, the shift is based at least in part on a quantity of CORESET symbols.

In a ninth aspect, alone or in combination with one or more of the first through eighth aspects, a last DMRS from the set of DMRSs is dropped based at least in part on a quantity of non-CORESET symbols and a quantity of symbols of DMRS of the set of DMRSs.

In a tenth aspect, alone or in combination with one or more of the first through ninth aspects, the time domain resource pattern includes a shift applied to a DMRS of the set of DMRSs based at least in part on a quantity of non-CORESET symbols, a quantity of DMRSs of the set of DMRSs, and a gap criterion between a first DMRS and a last DMRS of the set of DMRSs. In some aspects, the gap criterion between the first DMRS and the last DMRS is less than or equal to 9 symbols.

In an eleventh aspect, alone or in combination with one or more of the first through tenth aspects, the time domain resource pattern includes a shift applied to a plurality of DMRSs of the set of DMRSs based at least in part on at least one of a quantity of non-CORESET symbols, a starting symbol of a sequence, an interpolation-reduction rule, an extrapolation-reduction rule, a gap criterion, or a symbol quantity criterion.

In a twelfth aspect, alone or in combination with one or more of the first through eleventh aspects, the determination of the time domain resource pattern includes determining the time domain resource pattern based at least in part on a stored data structure identifying the time domain resource pattern.

In a thirteenth aspect, alone or in combination with one or more of the first through twelfth aspects, the determination of the time domain resource pattern includes determining the time domain resource pattern based at least in part on a time domain resource pattern generation procedure.

In a fourteenth aspect, alone or in combination with one or more of the first through thirteenth aspects, the time domain resource pattern includes a dropped DMRS that is configured for a symbol that is greater than a threshold quantity of symbols after a starting symbol of a sequence or of an allocation for the Type-B PDSCH.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
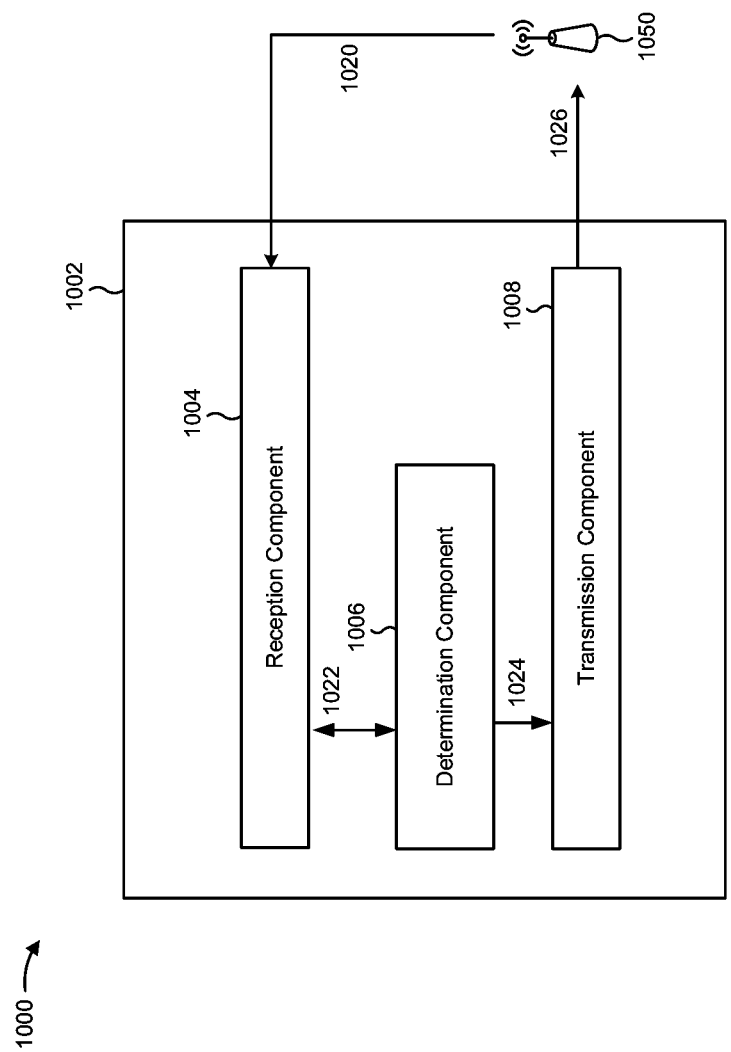
FIG. 10 is a conceptual data flow diagram illustrating a data flow between different modules/means/components in an example apparatus, in accordance with various aspects of the present disclosure.

FIG. 10 is a conceptual data flow diagram 1000 illustrating a data flow between different modules/means/components in an example apparatus 1002. The apparatus 1002 may be a UE (e.g., UE 120). In some aspects, the apparatus 1002 includes a reception component 1004, a determination component 1006, and/or a transmission component 1008.

Reception component 1004 may receive data 1020 from a BS 1050. For example, reception component 1004 may receive a set of DMRSs in accordance with a time domain resource pattern determined by determination component 1006. In some aspects, reception component 1004 may receive configuration information configuring the time domain resource pattern and/or a parameter thereof.

Determination component 1006 may receive data 1022 from reception component 1004 and/or provide data 1022 to reception component 1004. In some aspects, determination component 1006 may determine a time domain resource pattern for a set of DMRSs of a Type-B PDSCH. For example, determination component 1006 may determine a configuration of the Type-B PDSCH (e.g., a quantity of symbols, a quantity of DMRSs, a quantity of CORESET symbols, and/or the like), and may derive the time domain resource pattern for the set of DMRSs of the Type-B PDSCH. Additionally, or alternatively, determination component 1006 may access a stored data structure to determine the time domain resource pattern. In some aspects, determination component 1006 may provide data 1024 to transmission component 1008.

Transmission component 1008 may transmit data 1026 to BS 1050. For example, transmission component 1008 may transmit information associated with determining the set of DMRSs, a response to the set of DMRSs, and/or the like.

The apparatus 1002 may include additional components that perform each of the blocks of the algorithm in the aforementioned process 800 of FIG. 8 and/or the like. Each block in the aforementioned process 800 of FIG. 8 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of components (e.g., one or more components) shown in FIG. 10 may perform one or more functions described as being performed by another set of components shown in FIG. 10.

Figure 11:
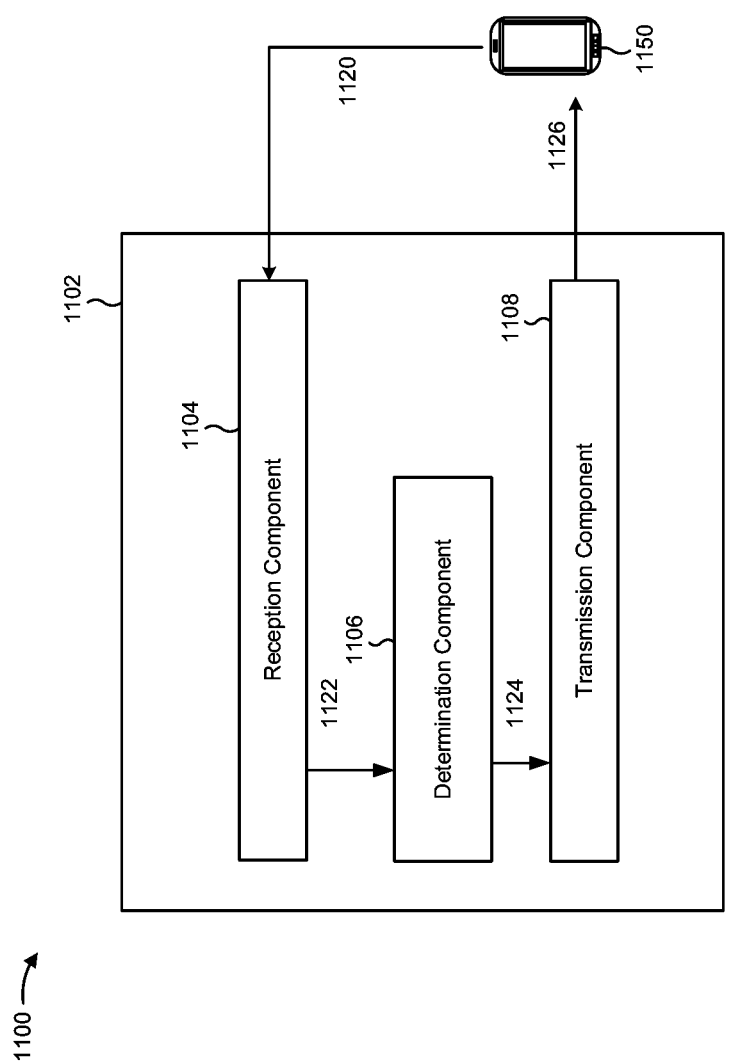
FIG. 11 is a conceptual data flow diagram illustrating a data flow between different modules/means/components in an example apparatus, in accordance with various aspects of the present disclosure.

FIG. 11 is a conceptual data flow diagram 1100 illustrating a data flow between different modules/means/components in an example apparatus 1102. The apparatus 1102 may be a BS (e.g., BS 110). In some aspects, the apparatus 1102 includes a reception component 1104, a determination component 1106, and/or a transmission component 1108.

Reception component 1104 may receive data 1120 from a UE 1150. For example, reception component 1104 may receive information associated with determining a set of DMRSs, information identifying a response to the set of DMRSs, and/or the like.

Determination component 1106 may receive data 1122 from reception component 1104, such as information associated with determining a set of DMRSs. In some aspects, determination component 1106 may determine a time domain resource pattern for a set of DMRSs of a Type-B PDSCH. For example, determination component 1106 may determine a configuration of the Type-B PDSCH (e.g., a quantity of symbols, a quantity of DMRSs, a quantity of CORESET symbols, and/or the like), and may derive the time domain resource pattern for the set of DMRSs of the Type-B PDSCH. Additionally, or alternatively, determination component 1106 may access a stored data structure to determine the time domain resource pattern. In some aspects, determination component 1106 may provide data 1124 to transmission component 1108, such as a time domain resource pattern for transmitting a set of DMRSs.

Transmission component 1108 may transmit data 1126 to UE 1150 based at least in part on receiving data 1124 from determination component 1106. For example, transmission component 1108 may receive information identifying a time domain resource pattern from determination component 1106 and may transmit a set of DMRSs in accordance with the time domain resource pattern. In some aspects, transmission component 1108 may transmit, to UE 1150, configuration information configuring the time domain resource pattern and/or a parameter thereof.

The apparatus 1102 may include additional components that perform each of the blocks of the algorithm in the aforementioned process 900 of FIG. 9 and/or the like. Each block in the aforementioned process 900 of FIG. 9 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of components (e.g., one or more components) shown in FIG. 11 may perform one or more functions described as being performed by another set of components shown in FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
   a memory; and
   one or more processors coupled to the memory, wherein the one or more processors are configured to:
   determine a time domain resource location for a set of demodulation reference signals (DMRSs) in a scheduled Type-B physical downlink shared channel (PDSCH) transmission, wherein: the time domain resource location is associated with a dropped DMRS corresponding to a symbol that is greater than a threshold quantity of symbols after a starting symbol of the scheduled Type-B PDSCH transmission; or the time domain resource location is associated with a shift corresponding to a last DMRS of the set of DMRSs based at least in part on a symbol length of the scheduled PDSCH transmission, a quantity of DMRSs of the set of DMRSs, and a gap criterion between a first DMRS and the last DMRS of the set of DMRSs; and
   receive the set of DMRSs based at least in part on the time domain resource location.

2. The UE of claim 1, wherein the time domain resource location is based at least in part on a second time domain resource location of an uplink or downlink signal.

3. The UE of claim 1, wherein the time domain resource location is based at least in part on a first quantity of control resource set (CORESET) symbols and a second quantity of non-CORESET symbols.

4. The UE of claim 1, wherein the time domain resource location is based at least in part on a reference time domain resource location for a second set of DMRSs corresponding to a Type-B physical uplink shared channel (PUSCH) transmission.

5. The UE of claim 4, wherein the reference time domain resource location is based at least in part on a quantity of non-control resource set (CORESET) symbols.

6. The UE of claim 4, wherein the reference time domain resource location is based at least in part on a total quantity of symbols including control resource set (CORESET) symbols and non-CORESET symbols.

7. The UE of claim 4, wherein the time domain resource location is based at least in part on a shift applied to the reference time domain resource location.

8. The UE of claim 7, wherein the shift is based at least in part on a quantity of control resource set (CORESET) symbols.

9. The UE of claim 1, wherein the time domain resource location is associated with the dropped DMRS corresponding to the symbol that is greater than the threshold quantity of symbols after the starting symbol of the scheduled Type-B PDSCH transmission.

10. The UE of claim 1, wherein the time domain resource location is associated with the shift corresponding to the last DMRS of the set of DMRSs based at least in part on the symbol length of the PDSCH transmission, the quantity of DMRSs of the set of DMRSs, and the gap criterion between the first DMRS and the last DMRS of the set of DMRSs.

11. The UE of claim 10, wherein the gap criterion between the first DMRS and the last DMRS is less than or equal to 9 symbols.

12. The UE of claim 1, wherein, to determine the time domain resource location, the one or more processors are configured to:
    determine the time domain resource location based at least in part on a data structure stored in the memory indicative of the time domain resource location.

13. The UE of claim 1, wherein the set of DMRSs includes a set of single symbol DMRSs.

14. The UE of claim 1, wherein the set of DMRSs includes a set of double symbol DMRSs.

15. The UE of claim 1, wherein the time domain resource location is associated with an offset from the first DMRS to a second DMRS of the set of DMRSs.

16. The UE of claim 15, wherein the offset is 3, 4, 5, 6, 7, 8, or 9 symbols in length.

17. The UE of claim 16, wherein the second DMRS is the last DMRS of the set of DMRSs.

18. A network entity for wireless communication, comprising:
    a memory; and
    one or more processors coupled to the memory, wherein the one or more processors are configured to:
        determine a time domain resource location for a set of demodulation reference signals (DMRSs) in a scheduled Type-B physical downlink shared channel (PDSCH) transmission, wherein: the time domain resource location is associated with a dropped DMRS corresponding to a symbol that is greater than a threshold quantity of symbols after a starting symbol of the scheduled Type-B PDSCH transmission; or the time domain resource location is associated with a shift corresponding to a last DMRS of the set of DMRSs based at least in part on a symbol length of the scheduled PDSCH transmission, a quantity of DMRSs of the set of DMRSs, and a gap criterion between a first DMRS and the last DMRS of the set of DMRSs; and
        transmit the set of DMRSs based at least in part on the time domain resource location.

19. The network entity of claim 18, wherein the time domain resource location is based at least in part on a second time domain resource location of an uplink or downlink signal.

20. The network entity of claim 18, wherein the time domain resource location is based at least in part on a first quantity of control resource set (CORESET) symbols and a second quantity of non-CORESET symbols.

21. The network entity of claim 18, wherein the time domain resource location is based at least in part on a reference time domain resource location for a second set of DMRSs corresponding to a Type-B physical uplink shared channel (PUSCH) transmission.

22. The network entity of claim 21, wherein the reference time domain resource location is based at least in part on a quantity of non-control resource set (CORESET) symbols.

23. The network entity of claim 21, wherein the time domain resource location is based at least in part on a shift applied to the reference time domain resource location.

24. The network entity of claim 23, wherein the shift is based at least in part on a quantity of control resource set (CORESET) symbols.

25. The network entity of claim 18, wherein the time domain resource location is associated with the dropped DMRS corresponding to the symbol that is greater than the threshold quantity of symbols after the starting symbol of the scheduled Type-B PDSCH transmission.

26. The network entity of claim 18, wherein the time domain resource location is associated with the shift corresponding to the last DMRS of the set of DMRSs based at least in part on the symbol length of the PDSCH transmission, the quantity of DMRSs of the set of DMRSs, and the gap criterion between the first DMRS and the last DMRS of the set of DMRSs.

27. The network entity of claim 26, wherein the gap criterion between the first DMRS and the last DMRS is less than or equal to 9 symbols.

28. The network entity of claim 18, wherein, to determine the time domain resource location, the one or more processors are configured to:
    determine the time domain resource location based at least in part on a data structure stored in the memory indicative of the time domain resource location.

29. The network entity of claim 18, wherein the set of DMRSs includes a set of single symbol DMRSs.

30. The network entity of claim 18, wherein the set of DMRSs includes a set of double symbol DMRSs.

31. The network entity of claim 18, wherein the time domain resource location is associated with an offset from the first DMRS to a second DMRS of the set of DMRSs.

32. The network entity of claim 31, wherein the offset is 3, 4, 5, 6, 7, 8, or 9 symbols in length.

33. The network entity of claim 32, wherein the second DMRS is the last DMRS of the set of DMRSs.

34. A method of wireless communication performed by a user equipment (UE), comprising:
    determining a time domain resource location for a set of demodulation reference signals (DMRSs) in a scheduled Type-B physical downlink shared channel (PDSCH) transmission, wherein: the time domain resource location is associated with a dropped DMRS corresponding to a symbol that is greater than a threshold quantity of symbols after a starting symbol of the scheduled Type-B PDSCH transmission; or the time domain resource location is associated with a shift corresponding to a last DMRS of the set of DMRSs based at least in part on a symbol length of the scheduled PDSCH transmission, a quantity of DMRSs of the set of DMRSs, and a gap criterion between a first DMRS and the last DMRS of the set of DMRSs; and
    receiving the set of DMRSs based at least in part on the time domain resource location.

35. The method of claim 34, wherein the time domain resource location is associated with the dropped DMRS corresponding to the symbol that is greater than the threshold quantity of symbols after the starting symbol of the scheduled Type-B PDSCH transmission.

36. The method of claim 34, wherein the time domain resource location is associated with the shift corresponding to the last DMRS of the set of DMRSs based at least in part on the symbol length of the PDSCH transmission, the quantity of DMRSs of the set of DMRSs, and the gap criterion between the first DMRS and the last DMRS of the set of DMRSs.

37. The method of claim 36, wherein the gap criterion between the first DMRS and the last DMRS is less than or equal to 9 symbols.

38. A method of wireless communication performed by a network entity, comprising:

determining a time domain resource location for a set of demodulation reference signals (DMRSs) in a scheduled Type-B physical downlink shared channel (PDSCH) transmission, wherein: the time domain resource location is associated with a dropped DMRS corresponding to a symbol that is greater than a threshold quantity of symbols after a starting symbol of the scheduled Type-B PDSCH transmission; or the time domain resource location is associated with a shift corresponding to a last DMRS of the set of DMRSs based at least in part on a symbol length of the scheduled PDSCH transmission, a quantity of DMRSs of the set of DMRSs, and a gap criterion between a first DMRS and the last DMRS of the set of DMRSs; and transmitting the set of DMRSs based at least in part on the time domain resource location.

39. The method of claim 38, wherein the time domain resource location is associated with the dropped DMRS corresponding to the symbol that is greater than the threshold quantity of symbols after the starting symbol of the scheduled Type-B PDSCH transmission.

40. The method of claim 38, wherein the time domain resource location is associated with the shift corresponding to the last DMRS of the set of DMRSs based at least in part on the symbol length of the PDSCH transmission, the quantity of DMRSs of the set of DMRSs, and the gap criterion between the first DMRS and the last DMRS of the set of DMRSs.

* * * * *